(12) United States Patent
Davis et al.

(10) Patent No.: US 6,227,913 B1
(45) Date of Patent: May 8, 2001

(54) FUSE BUS MEMBER AND CONNECTOR ASSEMBLY

(75) Inventors: Ruel Emmett Davis, St. Charles; Matthew Alan Joiner, Chesterfield, both of MO (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 09/102,100

(22) Filed: Jun. 22, 1998

(51) Int. Cl.[7] .................... H01R 13/68; H01R 33/95
(52) U.S. Cl. .................... 439/621; 439/724; 439/949
(58) Field of Search .................... 439/76.2, 949, 439/718, 621, 724

(56) References Cited

U.S. PATENT DOCUMENTS

| | | |
|---|---|---|
| 2,851,671 | 9/1958 | Luce . |
| 3,639,882 | 2/1972 | Honda et al. . |
| 4,221,455 | 9/1980 | Cairns et al. . |
| 4,432,594 | 2/1984 | Daggett . |
| 4,599,679 | 7/1986 | Baader . |
| 4,689,718 * | 8/1987 | Maue et al. .................... 439/76.2 |
| 4,798,545 * | 1/1989 | Roy et al. .................... 439/949 |
| 4,842,534 | 6/1989 | Mobley et al. . |
| 4,872,262 | 10/1989 | Marach . |
| 4,944,691 | 7/1990 | Marach . |
| 4,992,062 * | 2/1991 | Nakayama et al. .................... 439/621 |
| 4,997,394 | 3/1991 | Katz et al. . |
| 5,000,699 * | 3/1991 | Nadin .................... 439/511 |
| 5,023,752 * | 6/1991 | Detter et al. .................... 361/399 |
| 5,073,131 | 12/1991 | Levine . |
| 5,160,274 * | 11/1992 | Ozaki et al. .................... 439/949 |
| 5,186,661 * | 2/1993 | Capper .................... 439/718 |
| 5,254,010 * | 10/1993 | Davis .................... 439/108 |
| 5,438,310 | 8/1995 | Ikari . |
| 5,444,428 | 8/1995 | Carr et al. . |
| 5,474,475 | 12/1995 | Yamaguchi . |
| 5,605,465 * | 2/1997 | Kobayashi et al. .................... 439/76.2 |
| 5,788,519 * | 8/1998 | Stern .................... 439/189 |
| 5,831,814 * | 11/1998 | Hamill .................... 439/76.2 |
| 6,015,302 * | 1/2000 | Butts et al. .................... 439/76.2 |

* cited by examiner

*Primary Examiner*—Khiem Nguyen
*Assistant Examiner*—Hae Moon Hyeon
(74) *Attorney, Agent, or Firm*—Armstrong Teasdale LLP (57) ABSTRACT

A power distribution block assembly that includes an insulative body, at least one common electrically-conductive power bus member, a plurality of connector elements, and a sealed cover is disclosed. A U-shaped bus member includes a pluarlity of terminal blades extending therefrom, and plurality of separate connector elements connect the terminal blades to input side terminals of removable circuit elements, such as fuse elements or circuit breakers. Load side terminals of the fuse elements are received in load side connectors housed in passages in the body.

27 Claims, 11 Drawing Sheets

FUSE BUS MEMBER AND CONNECTOR ASSEMBLY

BACKGROUND OF THE INVENTION

1.) Field of the Invention

The invention relates to power distribution blocks in general. In particular, the invention relates to a fuse block having a common power bus.

2.) Related Art

Power distribution blocks are commonly used in the art to collect a plurality of circuit elements, such as fuses, in one central location.

Several fuse blocks are presently available as snap-together modules that form a multifused panel. These snap-together modules are excessively large when a large number of fuses are to be held in the block. The modules also involve costly, labor intensive, assembly.

Existing fuse block designs also commonly require the user to individually wire each circuit within the block for power input. When it is desired to power more than one circuit with the same power source, a jumper is installed for this purpose. These multiple wiring procedures, and the installation of a jumper, are costly, labor intensive and time consuming to the user. In addition, added circuits require the use of larger gauge wiring in order to handle the additional amp load. The use of larger gauge wire is costly, difficult to handle, and requires more panel space to mount the fuse block.

Another problem with existing designs is the inability to protect the fuse block components from contamination, especially from liquids. Although "splash covers" are available for some existing designs, these covers are in the form of additional components that must be bolted in place. This type of splash cover poses certain disadvantages in that it requires additional panel space to be secured, and presents an additional labor cost for installation.

U.S. Pat. No. 4,944,691 to Morach discloses a holder for removable circuit elements. The holder includes a metal bus bar having a plurality of fuse holders formed integrally therewith. Output terminals are provided which extend laterally from the bus bar. A cover member is provided that includes openings in the top for the insertion of fuses.

U.S. Pat. No. 4,599,679 to Baader discloses a fuse bus bar assembly that includes a bus bar formed as two separate components that are stacked on top of each other. The bus bar components include oppositely bent tangs that cooperate to receive fuse terminals for electrical connection therewith. A cover member is provided that includes a plurality openings for the receipt of fuses. This construction requires rather precise formation and assembly in order for the tangs to properly receive and mate with the fuse terminals. If one tang is misformed or damaged, it may be necessary to replace the entire bus bar component. In addition, the housing and cover do not serve to effectively isolate the circuit elements or fuses from contaminants.

U.S. Pat. No. 5,438,310 to Ikari discloses a fuse box formed by a plurality of separate components that are mechanically attached to each other. This construction is overly complex, costly to manufacture and assembly and less compact when compared to the unitary block body of the present invention.

U.S. Pat. No. 4,842,534 to Mobley et al. discloses a fuse/bus bar assembly having a plurality of (female) terminal members attached thereto. The physical attachment of the terminal members to the bus bar represents an increase in cost and labor over the construction of the present invention.

OBJECTS AND SUMMARY

It is an object of the present invention to provide a compact power distribution block that does not require the assembly of separate modules.

It is also an object of the present invention to provide a power distribution block that requires only a single power input connection to provide power to multiple circuits or circuit components. It is a further object to provide a construction wherein separate groups of circuit elements within the same unitary power block can be supplied with power from separate power sources.

It is yet a further object of the present invention to isolate the circuit elements within the distribution block and protect them from contamination, especially from splashed liquids.

These and other objects are achieved by providing a power distribution block assembly including an insulative body, at least one electrically-conductive bus member having a longitudinally-extending base and a plurality of terminal blades extending from the base, the base defining a site for electrical connection to a power source, the terminal blades defining a plurality of sites for electrical connection to a plurality of removable circuit elements, and a plurality of connector elements contained within said body, each of the connector elements being configured to electrically couple a terminal blade of the bus with a terminal of each of the removable circuit elements.

DETAILED DESCRIPTION OF THE PREFERRED EMBODIMENTS

Figure 1:
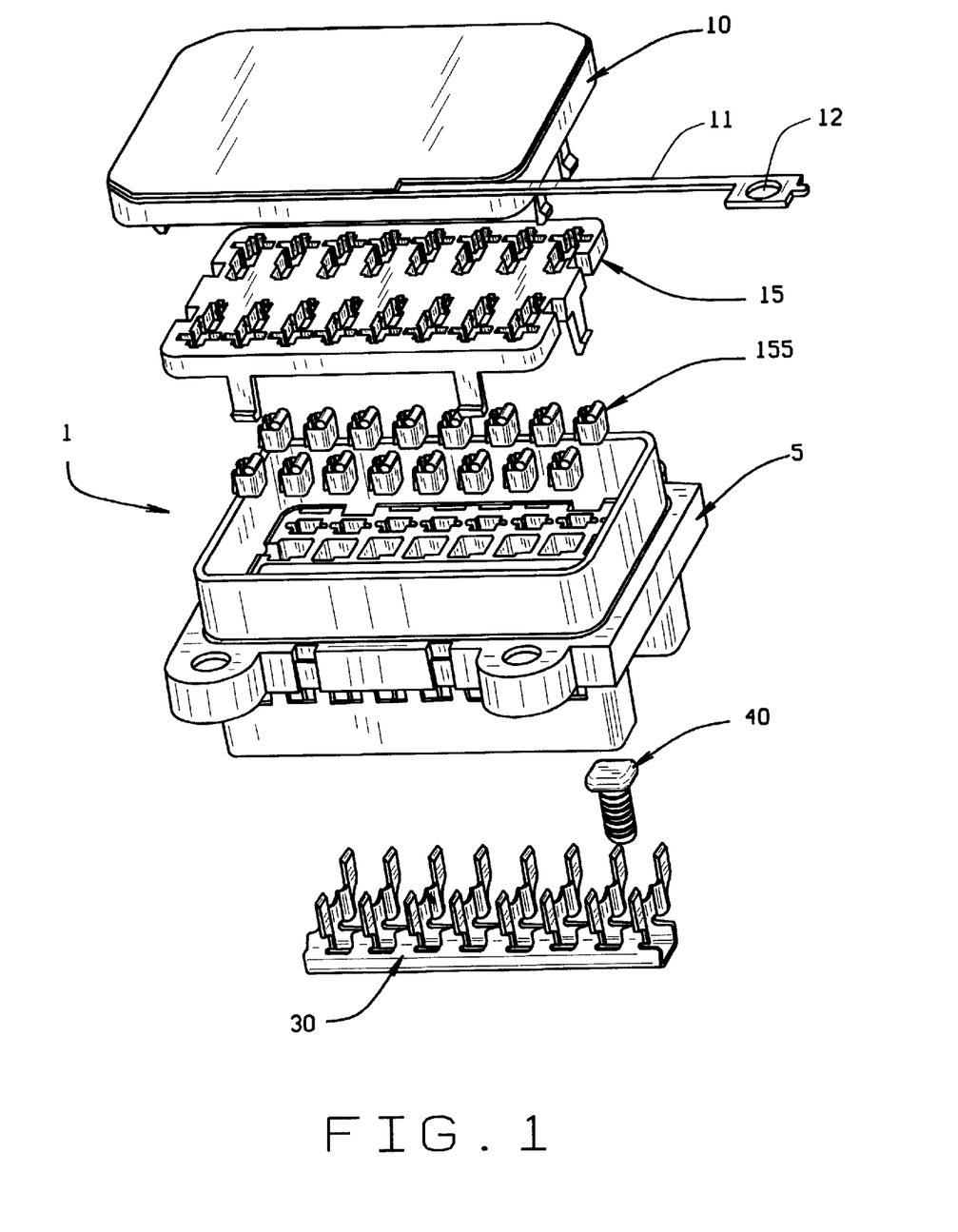
FIG. 1 is an exploded perspective view of a power distribution block constructed according to an embodiment of the present invention.

Certain components of a power distribution block assembly 1 according to the present invention are illustrated generally in FIG. 1. An insulative body 5 receives a tray member 15. A "splash-proof" cover 10 is mounted to the body 5 to enclose the interior thereof.

The insulative body 5 is preferably constructed as a unitary member. The term "unitary" is intended to means a one-piece monolithic member. The body 5 can be constructed from any suitable material. One preferred material is a strong, heat resistant, chemical resistant plastic.

The body 5 may have one or more mounting flanges 125, each having an aperture 127, with a threaded insert 130 disposed therein (FIG. 5) for receiving a suitable fastener (not shown). The body 5 is also provided with an upstanding sidewall 115 and an interior compartment 120.

Figure 2:
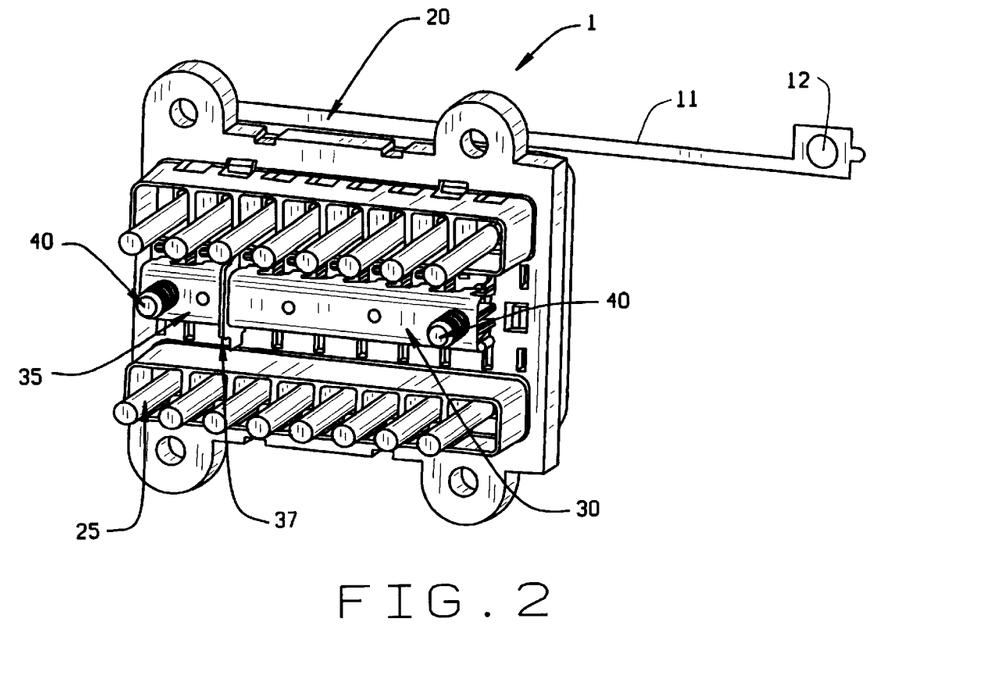
FIG. 2 is a bottom perspective view of a power distribution block of one embodiment of the present invention.

As illustrated in FIG. 2, one or more electrically-conductive bus members 30, 35 are inserted into the bottom of the insulative body 5. The power distribution block assembly 1 may include a plurality of electrically-conductive bus members 30, 35, each having a means of connecting to a power source. One such means is a threaded stud 40, although it is possible to use other types of connectors. If there are more than one conductive bus members 30, 35, they are separated from each other by a gap or an electrically-insulative spacer element 37. Through the use of separate conductive bus members 30, 35, it is possible to provide power to the power distribution block assembly 1 from a plurality of different sources.

For example, in vehicular applications it is often advantageous to provide power to certain circuit elements from a power source (e.g., a battery) at all times, and to provide power to other circuit elements only at certain times, e.g., when the ignition system of the vehicle is activated. While the embodiment illustrated in FIG. 2 shows a 12-pole bus 30 in combination with a 4-pole bus 35, it should be understood that the number of poles provided on each of the bus members 30, 35 can vary widely depending upon the requirements of the particular system being powered. By way of example, 4, 6, 8, 10, 12, 16, 20 and 24-pole configurations are also possible. Also, more than two bus members may be utilized. Alternatively, a single bus bar member may be utilized.

Figure 3:
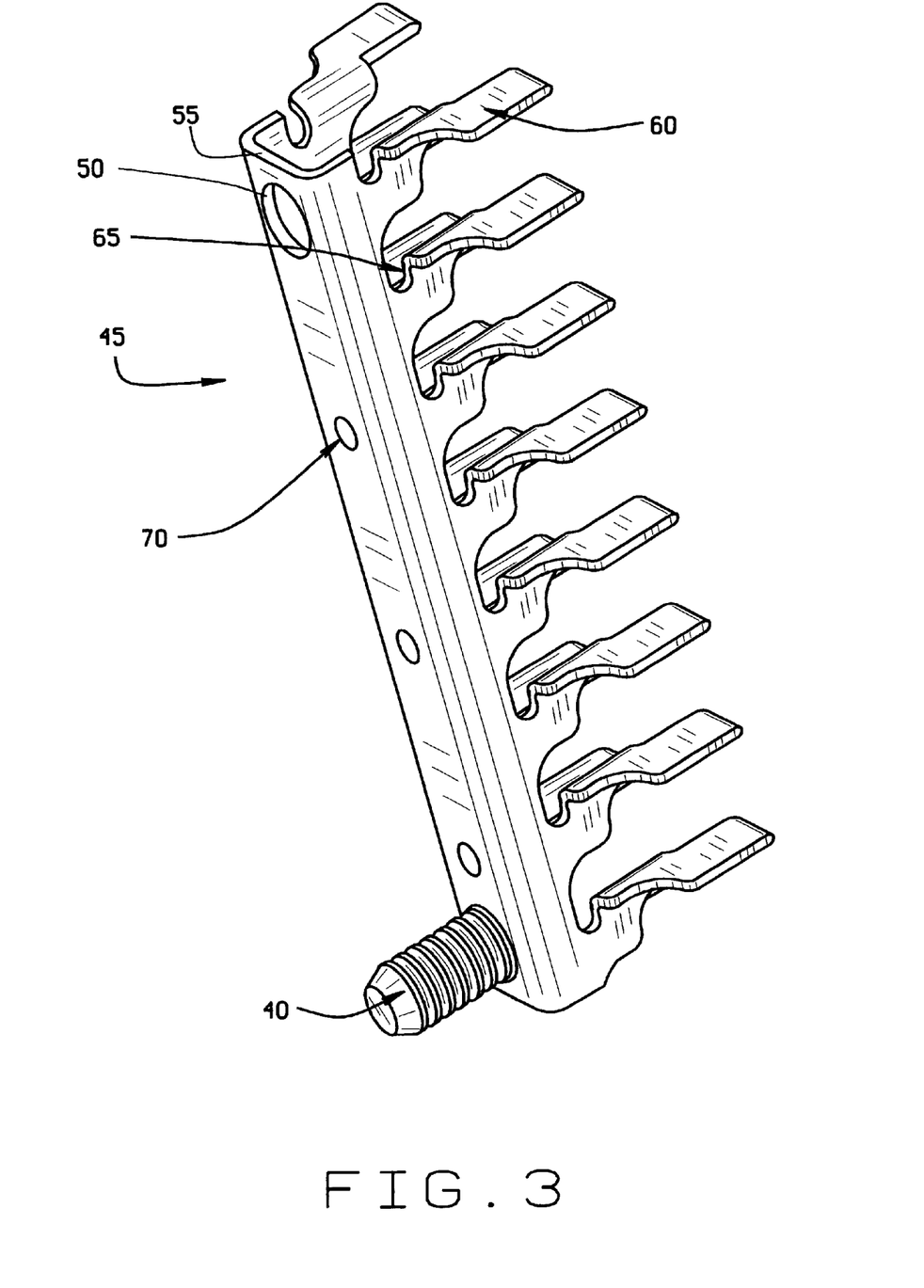
FIG. 3 is a perspective view of a power bus bar constructed according to the principles of the present invention.

Details of a representative bus member 45 constructed according to the present invention are illustrated in FIG. 3. Bus bar members 30, 35 may be constructed in the manner described below with respect to representative bus bar 45. The bus member 45 is made of any suitable electrically conductive material. Preferably, the material is capable of carrying relatively high currents. One such suitable material is C1100 alloy, which is 99.9% pure copper with a ½ hard temper. The bus member 45 has a longitudinally extended U-shaped base 55. One or more apertures 50 are provided in the base 55 to receive a suitable electrical connector, such as a threaded stud 40. An aperture 50 may be located at either end of the base 55. A stud 40 can be located at either end, thereby providing the most convenient location for connection to a power source and facilitating connection. The base 55 may optionally include one or more holes 70 through which a suitable fastener (not shown) may pass to affix the bus member 45 to the body 5. A plurality of power output wires 25 are attached to the block assembly 1 in a manner to be described more fully below.

As shown in FIG. 3, the conductive bus member 45 also includes a plurality of terminal blades 60 that extend from the legs of the U-shaped base 55. A plurality of attachment formations, preferably in the form of undercuts 65 are provided in the legs of the U-shaped base 55 at the location of each terminal blade 60. The construction of the bus member 45 provides several advantages. For example, the terminal blades 60 permit attachment of a plurality of circuit elements, as will be described more fully below. These circuit elements may be powered by a single electrical connection to the base 55, instead of resorting to jumpers or individual circuit wiring schemes. The bus member 45 can carry high currents with a close spacing of circuit elements without overheating, thereby providing reliability and compactness.

Figure 4:
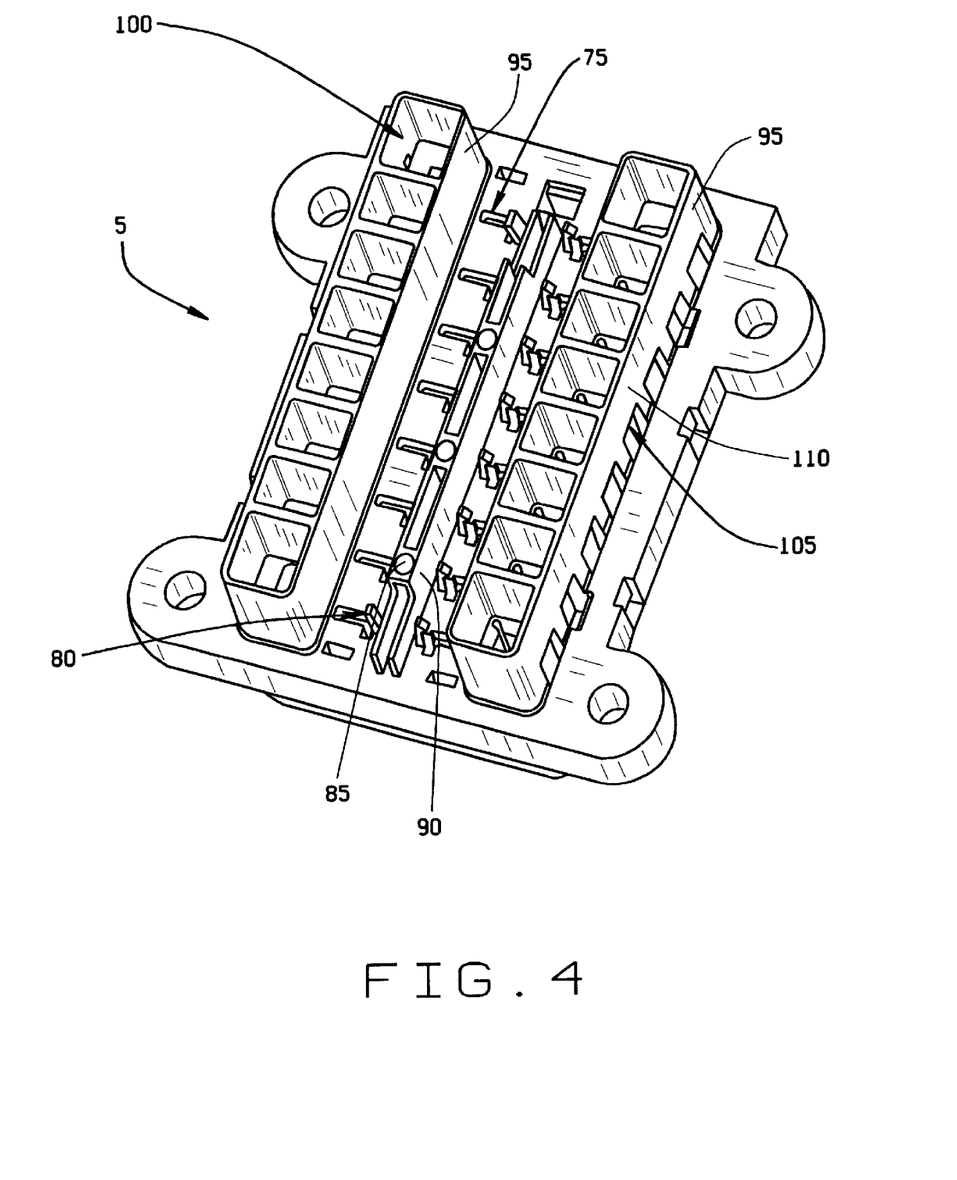
FIG. 4 is a bottom perspective view of a power distribution block body constructed according to the present invention.

The manner in which the bus member 45 can be attached to the insulative body 5 is further explained by reference to FIG. 4.

Slots 75 are provided in the bottom of body 5 to receive the terminal blades 60. These slots 75 can be numbered to facilitate identification of the individual circuit elements attached to each blade 60.

An attachment projection 80 is formed integrally with the body 5 and is located at each slot 75 to provide a snap-fit engagement with the undercuts 65 of the bus member 45. A bus attachment beam 90 may also be provided along the bottom of the body 5. Optionally, holes 85 can be provided in the beam 90. Holes 85 correspond with optional fastener holes 70 in the base 55 of the bus member 45 and accept suitable fasteners (not shown) for providing an added means of securing the bus member 45 to the body 5.

The body 5 further includes a pair of integrally formed parallel legs 95. Legs 95 define a plurality of open chambers 100 which permit the passage of connector elements, as will be more fully explained below.

Figure 5:
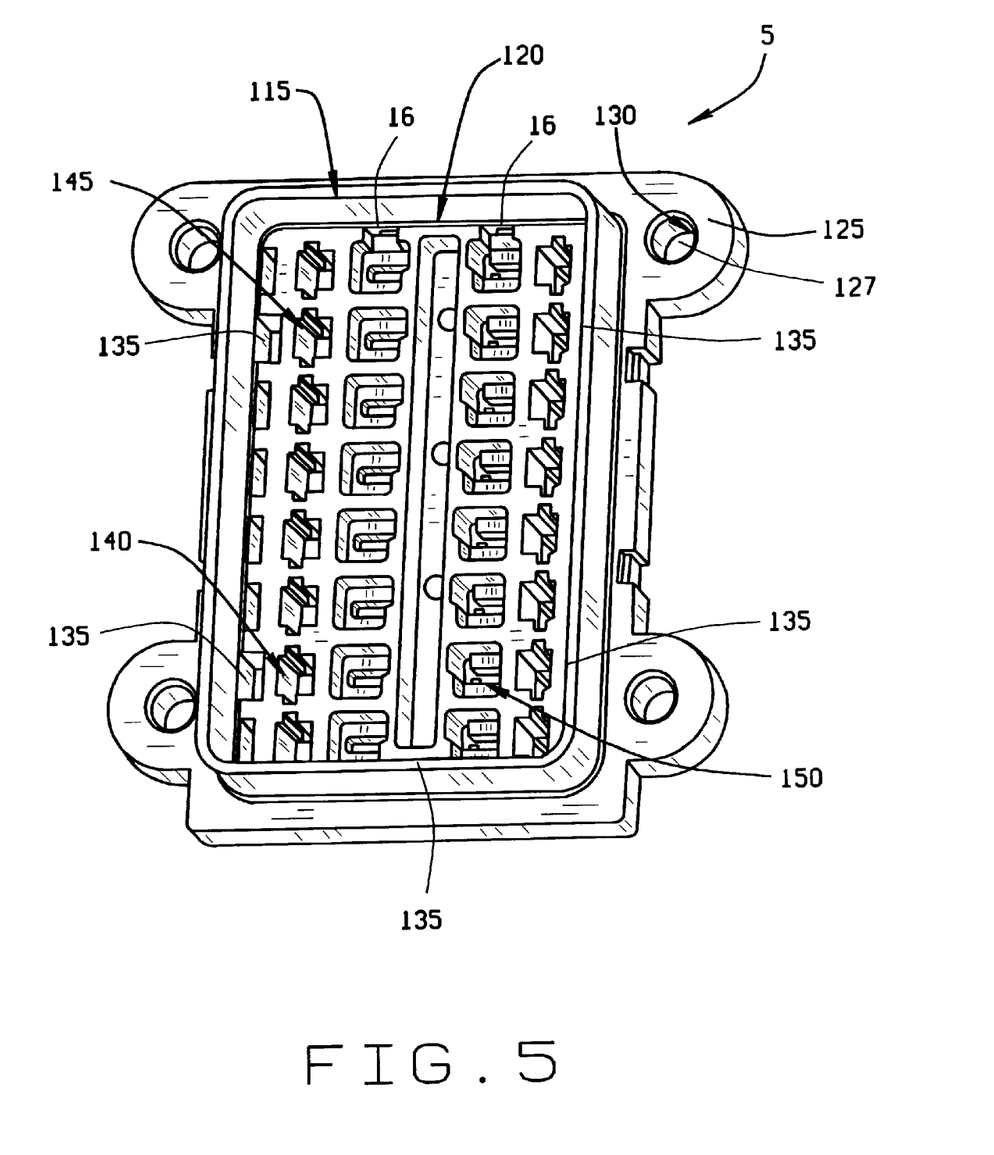
FIG. 5 is a top perspective view of the power distribution block body of FIG. 4.
Figure 6:
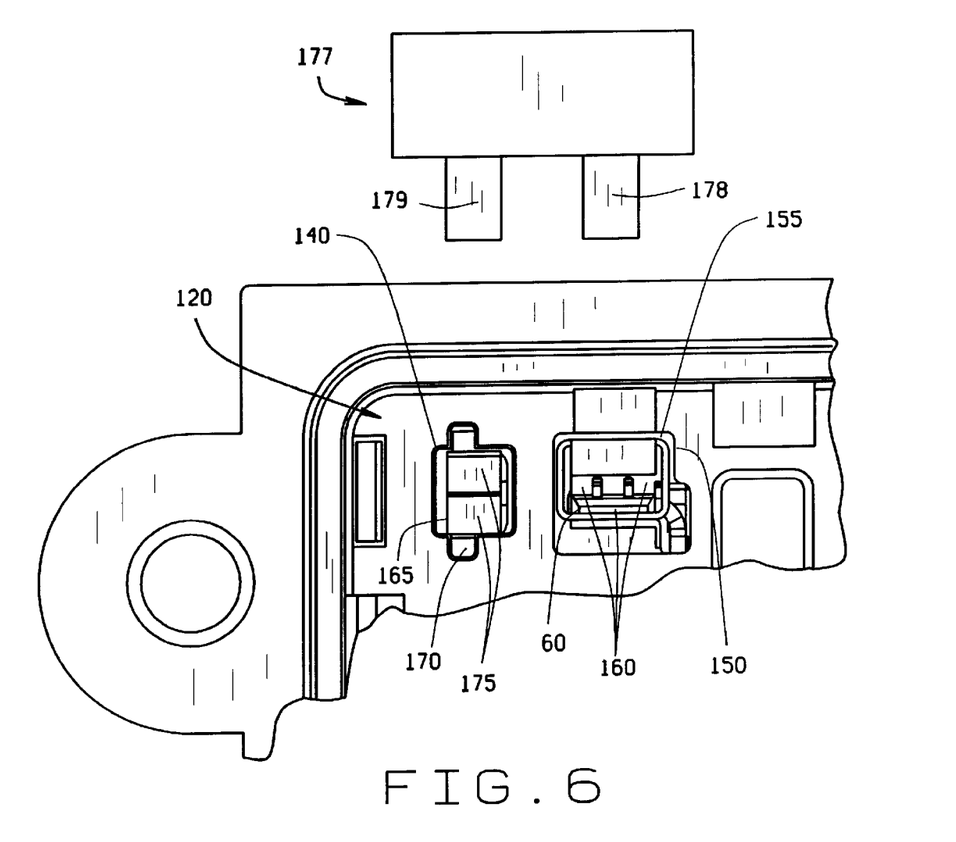
FIG. 6 is a partial top view of the power distribution block of FIG. 5 having a plurality of connector elements housed therein, and an associated removable circuit element.
Figure 7:
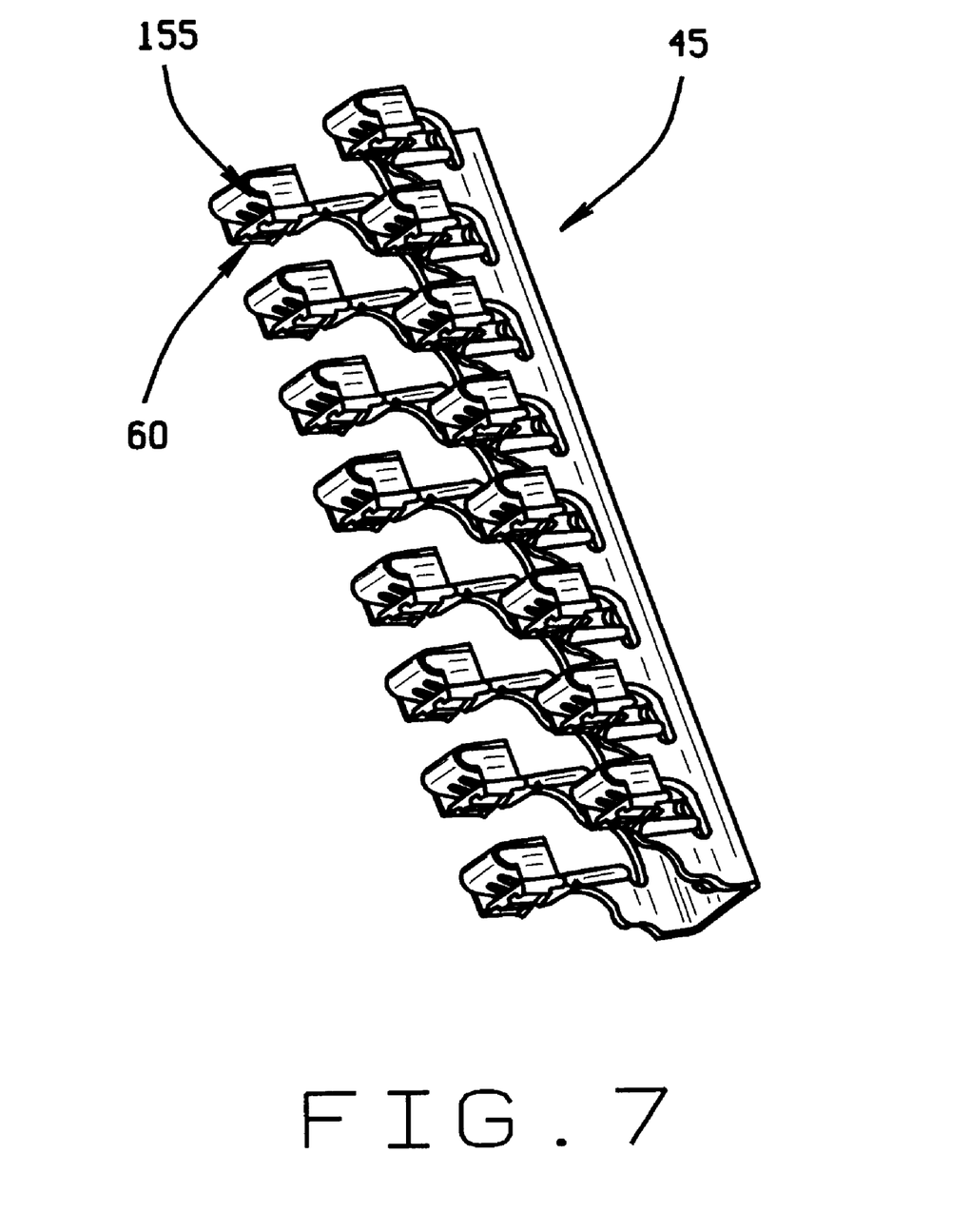
FIG. 7 is a perspective view of the power bus bar of FIG. 3 in combination with electrical connector elements.

The other side of the body 5 is described by reference to FIG. 5. Located within the interior compartment 120 are a plurality of passageways 140 for the receipt of a load side terminal of a removable circuit element. A plurality of pockets 150 are also provided within the interior compartment 120. Pockets 150 house a plurality of connector elements 155 (FIGS. 6 and 7). Terminal blade slots 75 extend from the bottom of body 5 and are in communication with the bottom of pockets 150.

As illustrated in FIGS. 6 and 7, a separate connector element 155 is located in each pocket 150. Terminal blades 60 extend up into pockets 150 through slot openings 75. Each connector element 155 fits over a terminal blade 60 in a manner best illustrated in FIG. 7. Connector element 155 are formed of any suitable material, such as stainless steel. An input side terminal 178 of a removable circuit element 177 can then be received between the spring fingers 160 of the connector element 155 and the terminal blade 60. In this manner a direct electrical connection is made between terminal 178 and terminal blade 60. Connector element 155 is not intended to be a current-carrying element.

A load-side female connector 165 is received within each of the passageways 140. See FIG. 8. A load-side terminal 179 can be received between two bent over contacts 175 of the female connector 165. A pair of locking members 170 project laterally from the female connector 165 and rest upon ledges 145 formed within pockets 140. This construction prevents the female connector 165 from passing through the bottom of open chambers 100. A plurality of retention tabs 167, 169 are provided at the lower end connector element 165 which receive and retain the output power wires W in a manner common in the art.

Figure 8:
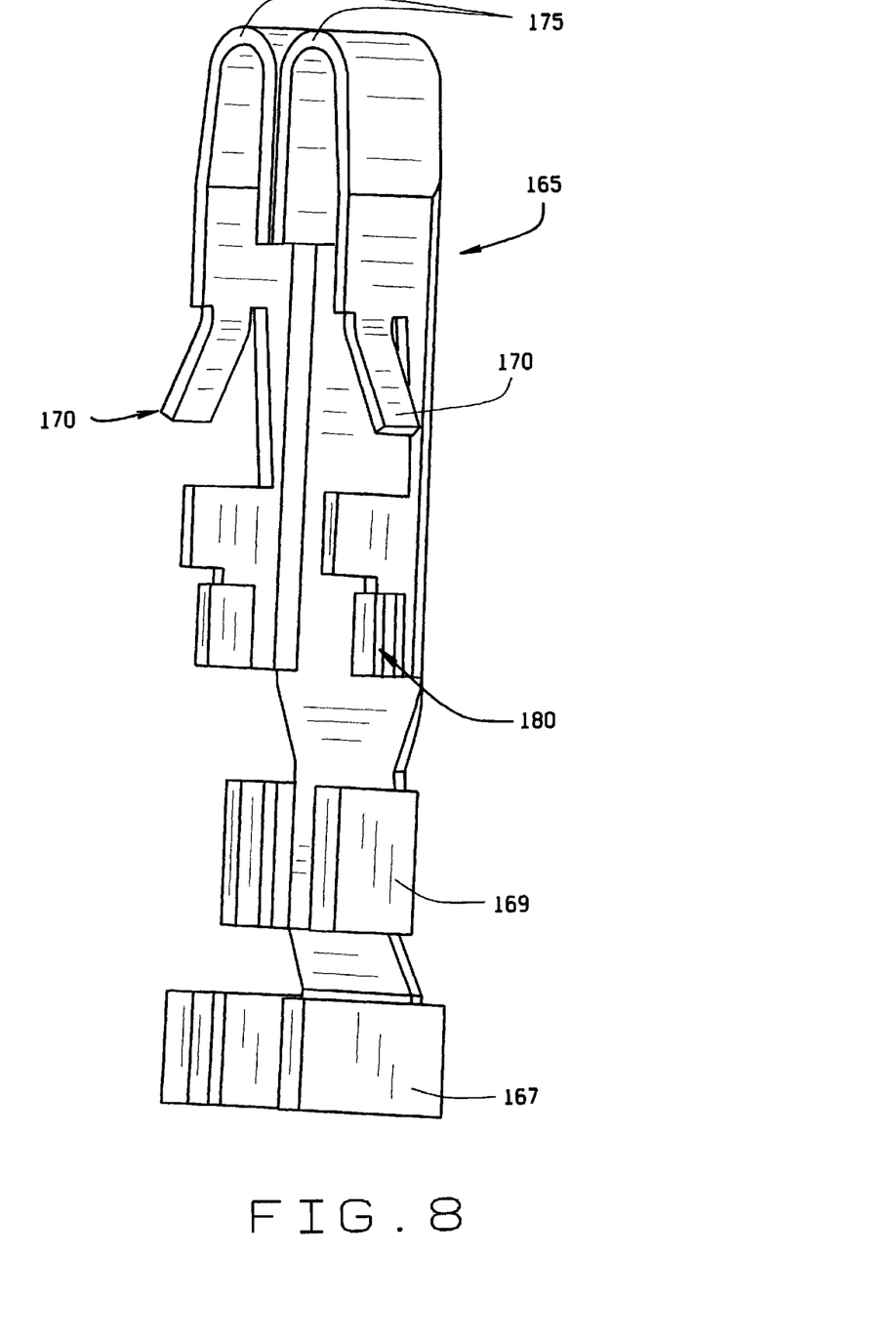
FIG. 8 is a perspective view of a female connector element utilized in connection with the present invention.

The female terminal connector 165 illustrated in FIG. 8 is similar to a "Packard" type connecting terminal. However, the present invention is not dependent upon the specific type of load-side connector utilized. Numerous connector designs are possible for connection to the load side terminal 179.

In one embodiment, removable circuit element 177 can comprise a fuse element. Numerous types of fuse elements can be utilized. By way of example, an ATC™ type fuse (available from Cooper Industries-Bussman Division) may be effectively utilized with the power distribution block of the present invention.

Figure 6A:
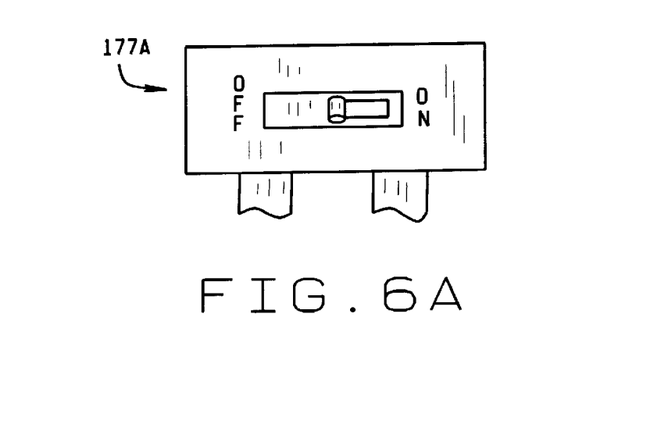
FIG. 6A is a partial view of an alternative embodiment of a removable circuit element.

In an alternative embodiment, the removable circuit element(s) may comprise a circuit breaker element 177A which is schematically illustrated in FIG. 6A.

Figure 9:
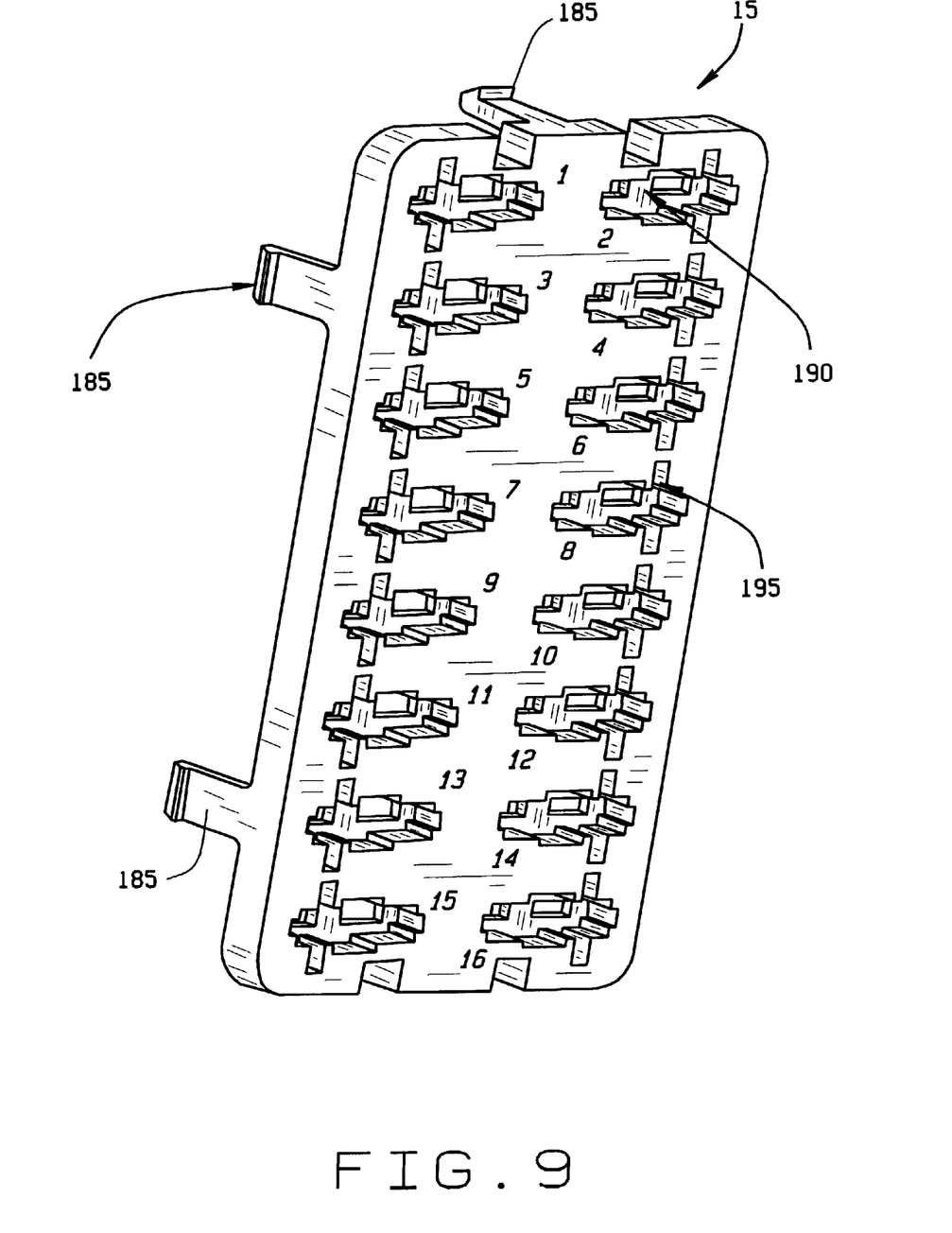
FIG. 9 is a perspective view of the tray element illustrated in FIG. 1.

As best illustrated in FIGS. 1 and 9, a tray 15 may also be located within the interior compartment 120 of body 5. Tray 15 is preferably formed of an insulative material similar to that of body 5. Tray 15 is provided with a plurality of retaining projections 185 that are received with a snap-fit in a plurality of corresponding retaining apertures 135 in the body 5 (FIG. 5). Proper insertion of the tray 15 within the internal compartment 120 can be insured by providing at least one retaining projection 185 which mates with a corresponding retaining aperture 135 only when tray 15 is properly oriented relative to the body 5.

The tray 15 is provided with a plurality of openings 190 which receive the removable circuit elements 177. The openings 190 may be numbered so as to correspond with the numbering of terminal blade slots 75, through facilitating identification of the circuits and circuit elements 177.

Openings 190 also include enlarged area 195 which permits the insertion of a removal tool (not shown) to withdraw load side connector 165.

By this construction, tray 15 guides and organizes the removable circuit elements 177. Tray 15 also serves to enclose and retain box connectors 155 and female connectors 165.

Figure 10:
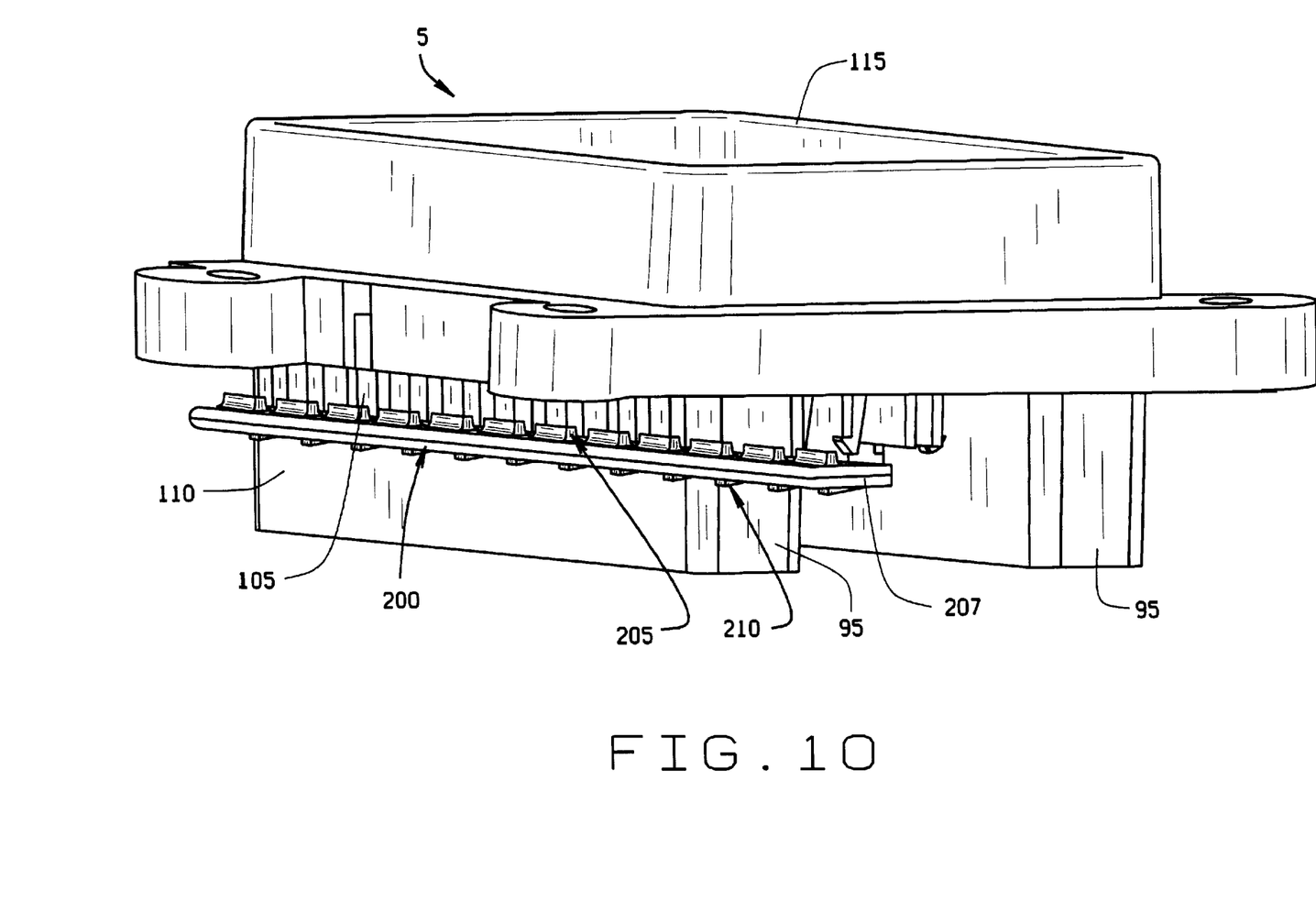
FIG. 10 is a perspective view of a power distribution block body as shown in FIG. 1, in combination with a female fuse clip locking member constructed according to the present invention.

In an alternative embodiment, the power distribution block assembly 1 may include an additional means for securing the female connector elements 165. One possible supplemental locking member 200 is illustrated in FIG. 10. Locking member 200 can be formed of any suitable material, such as an insulative material similar to that of body 5. Locking member 200 includes a plurality of bosses 205 that are adapted to fit within corresponding slot head recessed openings 105 formed in side surfaces 110 of legs 95. Locking projections 207 also fit within the slotted recessed openings 105. Locking projections 207 include a snap-fit tounges 210 that retain the locking member 200 once it is inserted into the openings 105. Locking projections 207 are configured to engage an engagement portion or shelf 180 formed on the female connector 165 (FIG. 8). Therefore, locking member 200 acts to further retain female connectors 165 within the open chambers 100.

Another aspect of the present invention involves providing a cover member 10 which effectively seals off the interior compartment 120 of the body 5, thereby preventing contamination of the circuit elements 177 and electrical connections housed therein. Cover member 10 can be formed of any suitable material, such as an insulative material similar to that of body 5.

Figure 11:
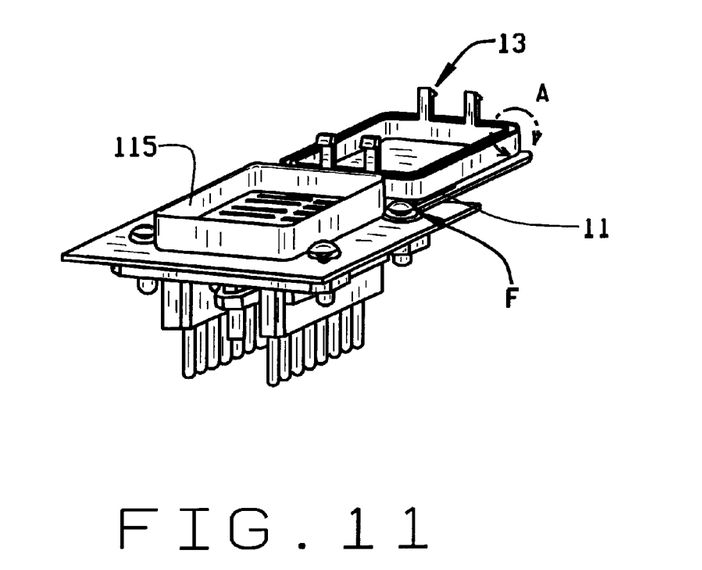
FIG. 11 is a perspective view of a power distribution block with an attached tethered cover constructed according to the present invention.
Figure 11A:
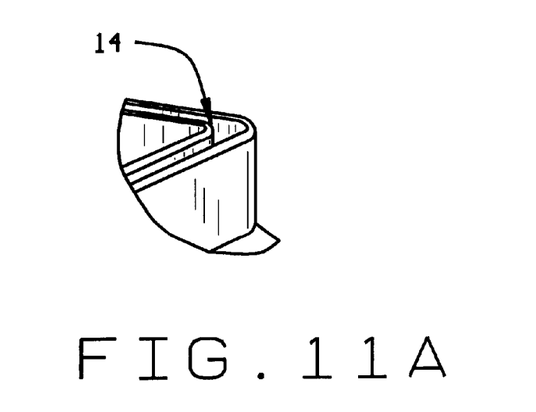
FIG. 11A is a detailed perspective view of a portion of the cover member of FIG. 11.

As best illustrated in FIGS. 1 and 11, cover 10 may include a plurality of retaining projections 13 that are received with a snap-fit in corresponding retaining apertures 16 provided within body 5. Cover 10 may also have an integral tether 11. Tether 11 has an aperture 12 located at an end thereof for receiving a suitable fastener F. By this construction, the cover is prevented from being lost or dropped when removed. Cover member 10 may further be provided with side walls in the form of a U-shaped channel 14. The U-shaped channel 14 is constructed to receive upstanding sidewall 115 of the body 5 therein. This arrangement forms an effective seal between the cover 10 and sidewall 115 that effectively excludes contaminants from the interior compartment 120, especially splashed liquids. Although not specifically illustrated, cover 10 may also include means to further facilitate grasping and removal, such as tabs, projections recesses, etc.

Only preferred embodiments of the invention are specifically illustrated and described herein. It should be appreciated that numerous modifications and variations of the present invention are possible in light of the present disclosure, such modifications and variations being encompassed within the scope of the appended claims without departing from the spirit and scope of the present invention.

What is claimed is:

1. A power distribution block assembly comprising:

an insulative body;

at least one electrically conductive bus member having a longitudinally-extending base and a plurality of terminal blades extending from said base, said base having a site for electrical connection to a power source and comprising a longitudinally elongated U-shape channel defined by opposite legs, said plurality of terminal blades extending from said legs, said terminal blades including a plurality of sites for electrical connection to a plurality of removable circuit elements; and a plurality of separate connector elements contained within said body, each of said connector elements being configured to engage a terminal blade of said bus with a terminal of a respective one of said removable circuit elements.

2. The power distribution block of claim 1, further comprising a tray that attaches to the insulative body, wherein said plurality of separate connector elements are secured between said insulative body and said tray.

3. The power distribution block of claim 2, further comprising a cover that attaches to the body so as to create an enclosed space for the tray and the removable circuit elements connected to the bus member.

4. The power distribution block assembly of claim 1, wherein:

said site for electrical connection to a power source includes an aperture in said base, and a threaded stud received within said aperture, said threaded stud adapted to mate with a wire lug of a power cable.

5. The power distribution block assembly of claim 1, wherein a plurality of said electrically-conductive bus members are provided, thereby enabling connection of said power distribution block assembly to a plurality of power sources.

6. The power distribution block assembly of claim 5, wherein said plurality of bus members are linearly aligned, and separated from each other by an insulative separator.

7. The power distribution block assembly of claim 1, wherein said electrically conductive bus member has between 4 and 24 terminal blades.

8. The power distribution block assembly of claim 1, wherein a plurality of undercuts are provided in the legs of said U-shaped base, and said body including a plurality of attachment projections, said attachment projections engaging said undercuts thereby coupling said bus to said body.

9. The power distribution block assembly of claim 1, wherein said body includes a plurality of pockets and a plurality of passageways disposed in an interior compartment.

10. The power distribution block assembly of claim 9, wherein:
   said body includes a plurality of slots for receiving said terminal blades;
   said pockets are in communication with said slots;
   said connector elements are contained within said pockets; and
   said terminal blades being electrically connected to terminals of said removable circuit elements by said connector elements within said pockets.

11. The power distribution block assembly of claim 10, wherein:
   said passageways are adjacent to said pockets; and
   said passageways are configured to receive terminals of said removable circuit elements.

12. The power distribution block assembly of claim 10, wherein said passageways include an enlarged opening configured to allow removal of at least one female load side connector.

13. The power distribution block assembly of claim 1, wherein said plurality of connector elements are box-type connector elements.

14. The power distribution block assembly of claim 1, wherein said body comprises a plurality of laterally-projecting mounting flanges.

15. The power distribution block assembly of claim 1, wherein said body comprises an interior compartment, said power distribution block assembly further comprising a tray disposed in said interior compartment, said tray having a plurality of openings configured to receive said removable circuit elements.

16. The power distribution block assembly of claim 15, wherein said tray includes a plurality of retaining projections that are received within a plurality of retaining apertures disposed in said body, whereby said tray is releasably connected to said body.

17. The power distribution block assembly of claim 15, wherein said openings in said tray include an enlarged opening region configured to allow removal of at least one female load side connector.

18. The power distribution block assembly of claim 3, wherein:
   said cover includes a plurality of retaining projections that are received within a plurality of retaining apertures disposed in said body, whereby said projections are releasably attached to said body.

19. The power distribution block assembly of claim 18, wherein:
   said cover includes a U-shaped channel;
   said body includes a projecting sidewall; and
   said sidewall mating with said U-shaped channel to form a splash-proof seal thereby preventing contamination of said interior compartment.

20. The power distribution block assembly of claim 19, wherein said cover includes an integral tether, said tether having an aperture configured to receive a fastener.

21. The power distribution block assembly of claim 1, wherein said body includes an exterior surface, a plurality of parallel legs extending from said exterior surface, each of said parallel legs defining a plurality of open chambers, each of said open chambers configured to receive a load-side connector for attachment to a terminal of one of said removable circuit elements.

22. The power distribution block assembly of claim 21, wherein:
   each of said parallel legs defines a side surface;
   a plurality of lock member passages disposed along said side surface, each of said lock member passages opening into one of said open chambers;
   a locking member having a plurality of locking projections, each of said lock projections extending into a lock member aperture; and
   said locking projections configured to mate with said female load-side connector thereby preventing disconnection of said load-side connectors.

23. The power distribution block assembly of claim 15, wherein:
   said removable circuit elements comprise fuses, each of said elements having a body and a plurality spaced male terminals;
   said fuses disposed in said plurality of openings in said tray;
   a first one of said male terminals of each of said fuses received within one of said connector elements and electrically coupled to one of said terminal blades thereby adapted to receive power from said power source;
   a second one of said male terminals electrically coupled to a female connector element thereby adapted to supply power to a power receiving device.

24. The power distribution block assembly of claim 1, wherein said removable circuit elements comprise circuit breaker elements.

25. A power distribution block assembly comprising:
   an insulative body;
   a plurality of electrically-conductive bus members, each having a longitudinally extending base and a plurality of terminal blades extending from said base, said base defining a site for electrical connection to a power source, said terminal blades defining a plurality of sites for electrical connection to a plurality of removable circuit elements;
   a plurality of separate connector elements contained within said body, each of said connector elements being configured to engage a terminal blade of said bus with a terminal of a respective one of said removable circuit elements.

26. The power distribution block of claim 25, wherein said insulative body is a unitary member.

27. The power distribution block of claim 25 wherein said plurality of bus members are linearly aligned, and separated from each other by an insulative separator.

* * * * *